United States Patent
Chow et al.

(10) Patent No.: US 12,431,672 B2
(45) Date of Patent: Sep. 30, 2025

(54) MODULAR SOCKET SYSTEM WITH AUTOMATIC POWER INTERRUPTION

(71) Applicant: CHIAN CHYUN ENTERPRISE CO., LTD., New Taipei (TW)

(72) Inventors: Hsiu Shen Chow, New Taipei (TW); Daniel Chou, New Taipei (TW)

(73) Assignee: CHIAN CHYUN ENTERPRISE CO., LTD., New Taipei (TW)

( * ) Notice: Subject to any disclaimer, the term of this patent is extended or adjusted under 35 U.S.C. 154(b) by 180 days.

(21) Appl. No.: 18/500,194

(22) Filed: Nov. 2, 2023

(65) Prior Publication Data

US 2024/0146004 A1    May 2, 2024

(30) Foreign Application Priority Data

Nov. 2, 2022   (TW) .................................. 111141901

(51) Int. Cl.
*H01R 13/713*   (2006.01)
*H01Q 1/22*   (2006.01)
*H01R 13/11*   (2006.01)

(52) U.S. Cl.
CPC ........... *H01R 13/713* (2013.01); *H01R 13/11* (2013.01); *H01Q 1/2291* (2013.01)

(58) Field of Classification Search
CPC ...... G01F 1/26; G01F 1/266; G01F 2200/261; H01Q 1/2291; H01R 13/11;

(Continued)

(56) References Cited

U.S. PATENT DOCUMENTS

2007/0050443 A1\* 3/2007 Ewing .................. G06F 13/364
    709/200
2010/0328849 A1\* 12/2010 Ewing ................. G06F 11/3089
    361/622

(Continued)

FOREIGN PATENT DOCUMENTS

CN    103401103 A  * 11/2013
CN    103401103 B    5/2014

(Continued)

OTHER PUBLICATIONS

Machine translation of Ge Chinese Patent Document CN 103401103 A Nov. 2013 (Year: 2013).\*

*Primary Examiner* — Kevin J Comber

(57) ABSTRACT

A modular socket system with automatic power interruption includes modular socket, a detected data collection and system determination module, a power-off execution module, and a sever database. The modular socket continuously receives power-off signals, and transmits the power-off signals to the detected data collection and system determination module for the determination of power-off, and the power-off execution module executes a power-off procedure accordingly. The detected data collection and system determination module includes a detected data collecting module and a power-off determining system module connected. The detected data collecting module has an optical identifying module and a connection status determining module connected. The power-off determining system module includes an unplug detecting and determining module, a poor contact determining module, a Bluetooth offline determining module, and a hardware disconnection determining module. The power-off execution module is connected to a system indicating completion of power-off.

13 Claims, 7 Drawing Sheets

(58) Field of Classification Search
CPC ............ H01R 13/16691; H01R 13/713; H01R 27/02; H02J 13/00002; H02J 13/00019
USPC .......................................................... 361/1
See application file for complete search history.

(56) References Cited

U.S. PATENT DOCUMENTS

2015/0188269 A1* 7/2015 Kim ..................... H01R 25/003
439/638
2017/0315873 A1* 11/2017 Alcorn ................... G11C 5/143

FOREIGN PATENT DOCUMENTS

| CN | 105244981 B | 12/2017 |
| CN | 106654739 B | 12/2018 |
| CN | 105527850 B | 9/2019 |
| TW | M495021 U | 2/2015 |
| TW | I540437 B | 7/2016 |
| TW | M525007 U | 7/2016 |
| TW | M612280 U | 5/2021 |

* cited by examiner

MODULAR SOCKET SYSTEM WITH AUTOMATIC POWER INTERRUPTION

Field of the Disclosure

The present invention relates generally to a system, and more particularly to a modular socket system which is capable of automatically turning the specified socket off by monitoring the contacts in each socket.

DESCRIPTION OF THE PRIOR ART

A conventional AC socket system may cut the power off when the socket system is overloaded. It will cut the whole socket system off instead of cutting the specified socket off. Conventional modular socket systems usually are two pin sockets or three pin sockets. A drawback of such modular socket system is that it can't provide high current to the sockets because of the areas of the contacts. Besides, the sockets are not firmly fixed, so that they will be loose after a long time of use.

The applicant tried to make a search by the following keywords, including (socket and plug and automatic power off and ordinary use); (modular and socket and electrical power; module and socket and plug); (automatic power off and power off when plug is unplugged and induced power off and Bluetooth power off); and (modular and socket and power supply), and 8 prior arts were collected.

The first prior art is a Taiwan utility model "Module Type Extension Wire Socket", issue no. TWM495021U, which provides several standard three pin sockets connected to each other. This invention provides a conventional extension cord connected to another extension cord only. It has no solution to prevent socket modules from disconnecting.

The second prior art is a Taiwan utility model "Detachable Power Cord", issue no. TWM525007U, which provides several standard two pin sockets connected to each other. This invention provides a conventional extension cord connected to another extension cord only. It can't control the current, so that it will be very dangerous when the current is high.

The third prior art is a Taiwan utility model "Improved Structure of Socket with Early Warning Function", issue no. TWM612280U, which provides an automatic power off function by detecting overload.

The fourth prior art is a China patent "Energy-Saving Charger Capable of Automatically Powering Off", issue no. CN105244981B, which provides a bridge rectifier circuit, a switch control circuit, a high-frequency transformer, and a low-voltage output circuit that are sequentially connected to be a DC charger.

The fifth prior art is a China patent "Automatic Cut-Off Conversion Socket for Electric Apparatus Standby", issue no. CN103401103B, which turns the power of the socket off by detecting the condition of the plug plugged in the socket.

The sixth prior art is a China patent "Socket with Intelligent Power Outage Function and Domestic Equipment Intelligent Power Outage Realization Method", issue no. CN106654739B, which automatically turns the power of the socket off by detecting the condition of the plug plugged in the socket in standby.

The seventh prior art is a China patent "Power-Cut Reminding Method and Device", issue no. CN105527850B, which monitors the working status of the intelligent socket, turning the power off or on, sending a power-off message and an alarm to the terminal, checking it if it is abnormal and repowering the normal socket, labeling the normal and abnormal sockets, and sending a diagnosis and repowering message to sending the terminal the corresponding malfunction report and repowering message.

The eighth prior is a Taiwan patent "Power-Loss Protection", issue no. TWI540437B, which provides a power and power-off detecting circuit and a M.2 card or includes a temporary power, a power-off detecting circuit and an input and a protection method for responding the instruction and sending a signal to an electronic card.

Aforesaid prior arts fail to teach modular sockets, automatic power-off system, semi-rotary connector for enhancing the connection of the modular sockets, maximum the electrical power and the thickness of the conductive material in the modular socket, and automatic power-off if the socket on the wall. There are several drawbacks in the prior arts which reduce the utility of the device, and that is what the designers and consumers have to break through.

SUMMARY OF THE DISCLOSURE

In light of the above reasons, the primary objective of the present invention is to provide a modular socket system, which includes a modular socket, a detected data collection and system determination module, a power-off execution module, and a sever database, which are connected to each other. The modular socket includes a semi-rotary connector, the detected data collection and system determination module includes a detected data collecting module and a power-off determining system module, wherein the detected data collecting module has an optical identifying module and a connection status determining module, and the power-off determining system module includes an unplug detecting and determining module, a poor contact determining module, a Bluetooth offline determining module, a hardware disconnection determining module. The power-off execution module is connected to the system to indicate that the socket is automatically turned off, and includes a unplug detection power-off module, a poor contact power-off module, and a Bluetooth offline power-off module. To fix the problems in the prior arts.

The secondary objective of the present invention is to provide a modular socket system capable of automatically power off, which may continuously receive power-off signals through the modular sockets, including various conditions of the sockets, and transmit the signals to the detected data collection and system determination module 2, and then the power-off execution module turns the power off when the detected data collection and system determination module determines to proceed the power-off procedure. The server database, the detected data collecting module, and the power-off determining system module are connected and provide detecting records and power-off determining records to maximum the thickness of the conductive material in the sockets and the electrical power.

The third objective of the present invention is to provide a modular socket system capable of automatically power off, which provides a convenient usage and an easy way to assemble the socket according to the user. Various ways of power-off determination to control the individual sockets to turn the power off. It provides a firm structure and high safety through the sockets and the semi-rotary connectors, and makes sure of normally working of the automatic power-off function all the time.

The present invention fixes the drawbacks of the conventional AC socket system, which cut the power off through overload, and the whole socket system is cut off instead of individual socket. The conventional socket systems usually are two pin sockets or three pin sockets, with which the problems are that the area of the connector is limited so that it can't provide high current, and the connections between the sockets are not firm so that they will loose after a time of use. The first prior art, Taiwan utility model "Module Type Extension Wire Socket" (issue no. TWM495021U), provides several standard three pin sockets connected to each other. This invention provides a conventional extension cord connected to another extension cord only. The second prior art, Taiwan utility model "Detachable Power Cord" (issue no. TWM525007U), provides several standard two pin sockets connected to each other. This invention provides a conventional extension cord connected to another extension cord only. It can't control the current, so that it will be very dangerous when the current is high. The third prior art, Taiwan utility model "Improved Structure of Socket with Early Warning Function" (issue no. TWM612280U), provides an automatic power off function by detecting overload. The fourth prior art, China patent "Energy-Saving Charger Capable of Automatically Power Off" (issue no. CN105244981B), provides a bridge rectifier circuit, a switch control circuit, a high-frequency transformer, and a low-voltage output circuit that are sequentially connected to be a DC charger. The fifth prior art, China patent "Automatic Cut-Off Conversion Socket for Electric Apparatus Standby" (issue no. CN103401103B), turns the power of the socket off by detecting the condition of the plug plugged in the socket. The sixth prior art, China patent "Socket with Intelligent Power Outage Function and Domestic Equipment Intelligent Power Outage Realization Method" (issue no. CN106654739B), automatically turns the power of the socket off by detecting the condition of the plug plugged in the socket in standby. The seventh prior art, China patent "Power-Cut Reminding Method and Device" (issue no. CN105527850B), monitors the working status of the intelligent socket, turning the power off or on, sending a power-off message and an alarm to the terminal, checking it if it is abnormal and repowering the normal socket, labeling the normal and abnormal sockets, and sending a diagnosis and repowering message to sending the terminal the corresponding malfunction report and repowering message. The eighth prior, Taiwan patent "Power-Loss Protection" (issue no. TWI540437B), provides a power and power-off detecting circuit and a M.2 card or includes a temporary power, a power-off detecting circuit and an input and a protection method for responding the instruction and sending a signal to an electronic card. In conclusion, the prior arts fail to disclose the modular socket, automatic power-off system, semi-rotary connector to enhance the connections between the sockets, maximum thickness of the conductive material un the modular socket, and the automatic power-off system for the wall socket. The prior arts has many drawbacks so they are not good for usage.

In order to fix the problem as described above the present invention provides a modular socket system capable of automatic power-off, comprising a modular socket including a plurality of sockets connected to each other, and each of the socket has a module to receive power-off signals, wherein the modular socket obtains status data for determining to proceed a power-off procedure, and the status data include socket unplugged data, socket contact data, Bluetooth connection data, and hardware contact data to obtain an association with users and information of power-off; a detected data collection and system determination module connected to the modular socket to collect all the status data of the modular socket for determination of power-off, wherein the detected data collection and system determination module includes a detected data collecting module and a power-off determining system module connected to each other, and further wherein the detected data collecting module has an optical identifying module and a connection status determining module connected to each other, and the power-off determining system module includes an unplug detecting and determining module, a poor contact determining module, a Bluetooth offline determining module, and a hardware disconnection determining module; a power-off execution module connected to the power-off determining system module of the detected data collection and system determination module to automatically cut the power of the modules of the modular socket; and a server database connected to the detected data collecting module and the power-off determining system module of the detected data collection and system determination module, wherein the server database a server and a database, which are real hardware or virtual devices, and no limitation to the structure, system, operating system, and ways of execution, are connected to the modular socket system for usage and determination, and further wherein the server database, which records and accesses data and information, includes at least a detected record and at least a power-off determination record, which are determining results of the data obtained by the detected data collection and system determination module; wherein the modular socket continuously receives power-off signals, including various conditions of the sockets, and transmits the power-off signals to the detected data collection and system determination module for the determination of power-off, and the power-off execution module executes a power-off procedure accordingly.

In an embodiment, the module of the modular socket includes a power module, an AC module, a DC module, an (Wi-Fi) access point module.

In an embodiment, the optical identifying module of the detected data collecting module examines optical data to find all check points in the optical data which is related to automatic power-off to determine to proceed the power-off procedure.

In an embodiment, the power-off execution module is connected to a system indicating completion of power-off, and includes a unplug detection power-off module, a poor contact power-off module, a Bluetooth offline power-off module, and a hardware disconnection power-off module, which are connected to each other.

In an embodiment, the sockets of the modular socket are combined according to a user's need, including numbers and types of the sockets.

In an embodiment, the each of the sockets of the modular socket includes a semi-rotary connector with a slot to provides a copper material therein with a sufficient thickness.

In an embodiment, each of the sockets of the modular socket includes a switch to manipulate the sockets and the module respectively.

In an embodiment, the modular socket receives power-off information and replaces the modular socket with the sockets or the relevant products to automatically cut the power off with an API connector or a USB connecting to the modular socket system.

In an embodiment, each of the sockets of the modular socket is connected to a power display module of the charging module to show residual power.

In an embodiment, the modular socket system is able to be directly applied to a power supply or a system other than the socket, and automatically cut off the power of the socket which has a unplugged plug or a poor contact.

In an embodiment, the each of the sockets of the modular socket has at least a socket hole, and the socket hole includes USB type A, B, C and Lightening to have the function of potable power supply.

In an embodiment, the modular socket further has a power supply of power module reminder and alarm module to integrate the power module and provide a function of reminder and alarm of power supply.

Comparison with the prior arts, the modular socket system capable of automatic power-off includes the modular socket, the detected data collection and system determination module, the power-off execution module, and the sever database, which are connected to each other. The modular socket has the semi-rotary connector, the detected data collection and system determination module has the detected data collecting module and the power-off determining system module, wherein the detected data collecting module has the optical identifying module and the connection status determining module, and the power-off determining system module includes the unplug detecting and determining module, the poor contact determining module, the Bluetooth offline determining module, and the hardware disconnection determining module. The power-off execution module is connected to the system indicating completion of power-off, and includes the unplug detection power-off module, the poor contact power-off module, the Bluetooth offline power-off module, and the hardware disconnection power-off module. The modular socket continuously receives power-off signals, including various conditions of the sockets, and transmits the signals to the detected data collection and system determination module for the determination of power-off, and the power-off execution module executes the power-off procedure. The sever database is connected to the detected data collecting module and the power-off determining system module to provides the detected records and the power-off determination records. The thicknesses of the conductive materials in the socket with the module and the power are maximum. The sockets may be assembled according to the user's requirement to have a convenient usage. Various power-off determinations may cut the power of the individual socket off. The socket and the semi-rotary connector provide a firm connection and high safety, and furthermore it may ensure that the automatic power-off operation may function normally. The present invention enlarges the utility of the industry of the arts and has novelty and inventive step.

BRIEF DESCRIPTION OF THE DRAWINGS

The present invention will be best understood by referring to the following detailed description of one illustrative embodiment in conjunction with the accompanying drawings, in which.

DETAILED DESCRIPTION

Figure 1:
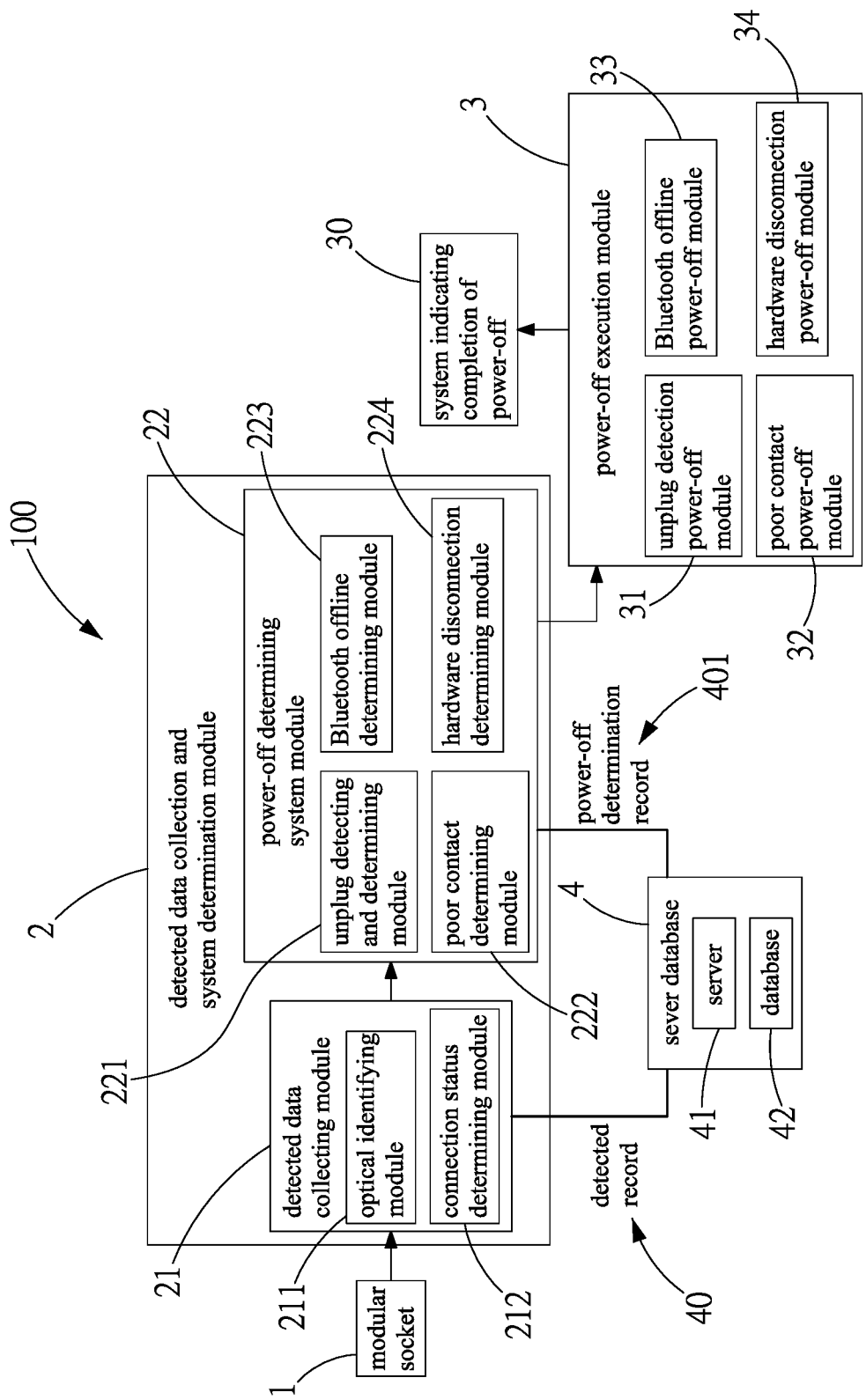
FIG. 1 is a block diagram of a preferred embodiment of the present invention.

To provide a better understanding for people in this field, the following describes several embodiments of the present invention, along with detailed explanations of the structure and intended benefits of the invention, in conjunction with accompanying drawings. It should be noted that the drawings are simplified schematic representations and, therefore, only show components and their relationships relevant to the invention to provide a clearer description of the basic structure or implementation method of the invention. The actual components and layout may be more complex. Additionally, for the sake of clarity, the components shown in the drawings of the present invention are not drawn with their actual names, compositions, or quantities, and specific names, compositions, and quantities of components can be adjusted according to practical requirements.

Please refer to FIG. 1, FIG. 2, FIG. 3, FIG. 4, FIG. 5, FIG. 6 and FIG. 7, which are the block diagram of the preferred embodiment of the present invention, the modular socket of the USB port (DC) socket and the (AC) socket, the modular socket of the USB port (DC) socket, the modular socket of the (AC) sockets, the socket with the semi-rotary connector, the modular socket with the power information module; and the block diagram of another preferred embodiment of the present invention. The modular socket system 100 capable of automatic power-off of the preferred embodiment of the present invention includes a modular socket 1, a detected data collection and system determination module 2, a power-off execution module 3, and a sever database 4.

The modular socket 1 includes a plurality of sockets 11 and modules 12 for receiving power-off signals. The modular socket 1 may obtain status data for determining to proceed a power-off procedure or not. The status data include socket unplugged data, socket contact data, Bluetooth connection data, and hardware contact data etc. to obtain an association with the user and the information of power-off. The modular socket 1 of the present invention may have the sockets 11 combined according to the user's need, such as numbers and types of the sockets 11. The socket 11 has at least a socket hole 110. The module 12 of the modular socket 1 includes a power module, an AC module, a DC module, an (Wi-Fi) access point module, and other socket modules. The power module is connected to the AC module, the DC module, the (Wi-Fi) access point module, and other socket modules to assemble the sockets according to the user's need. The sockets of the modular socket 1 each includes a semi-rotary connector 121, and may keep the copper with a sufficient thickness that may fix the problem of poor power supply of the conventional sockets which are simply connected to each other to have high capacity and ensure the connection strength. The modules 12 of the modular 1 each has a switch 120 to manipulate the sockets 11 and the module 12 respectively.

Figure 2:
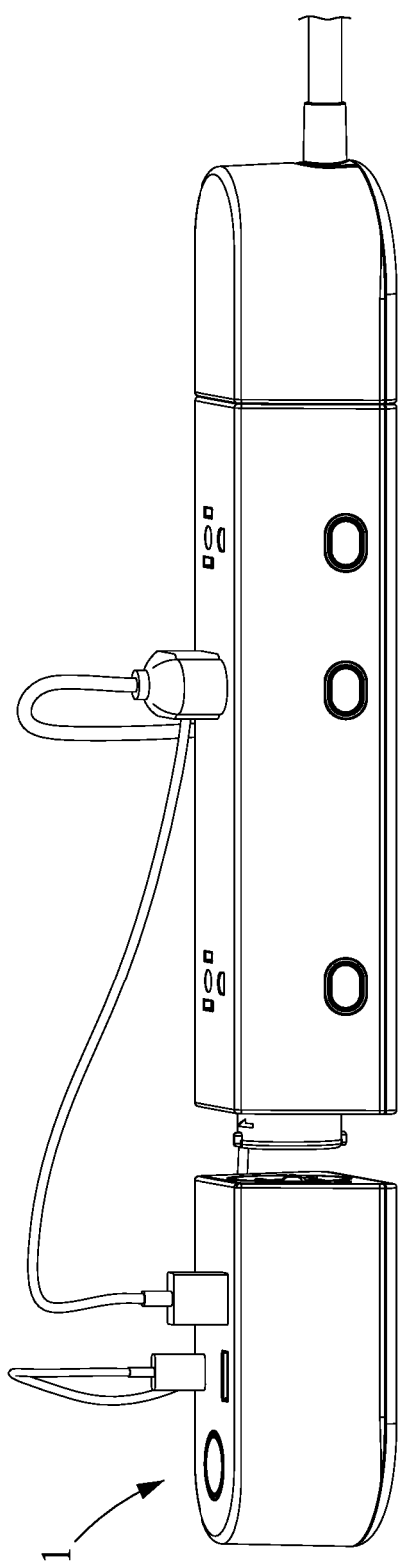
FIG. 2 is a perspective view of the preferred embodiment of the present invention, showing the modular socket of the USB port (DC) and the AC socket.
Figure 3:
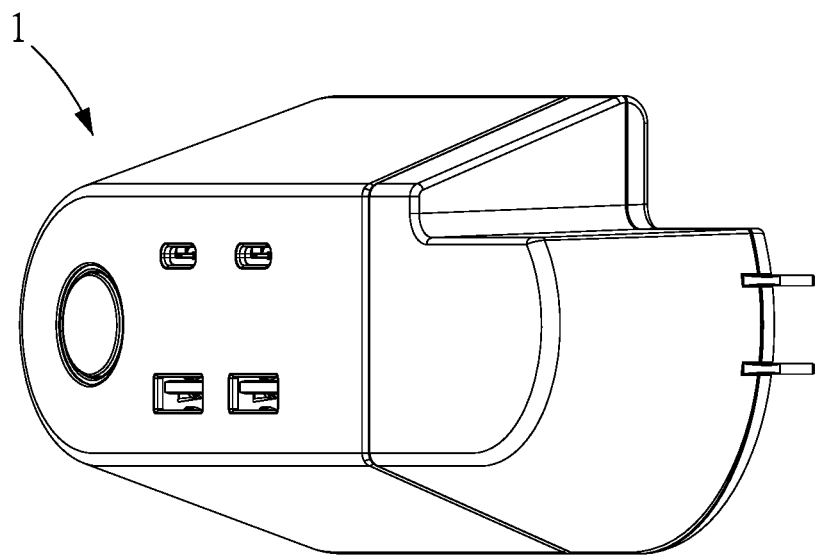
FIG. 3 is a perspective view of the preferred embodiment of the present invention, showing the modular socket of the USB port (DC)
Figure 4:
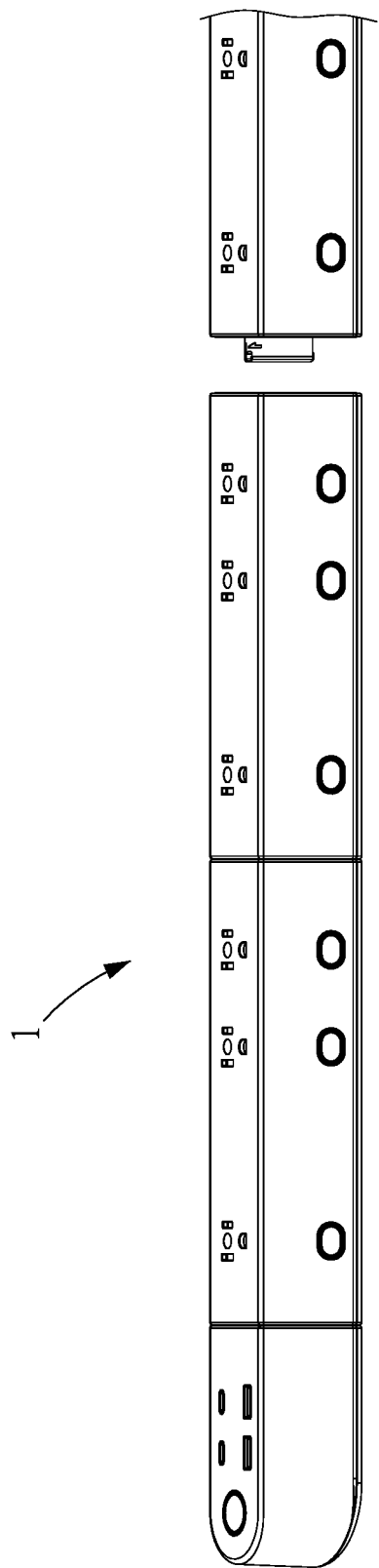
FIG. 4 is a perspective view of the preferred embodiment of the present invention, showing the modular socket of the AC socket.

The modular socket 1 of the present invention provides a variety of combinations of the sockets. The types, numbers and sequences of the sockets 11 for combination are not limited. Hereunder are three examples of the combinations. FIG. 2, FIG. 3 and FIG. 4 show the modular socket of USB port (DC) and the AC socket, the modular socket of the USB port (DC) and the modular socket of the AC socket. As shown in FIG. 2, on the right side is a USB port (DC) and on the right side is an AC socket, and with the combination of above forms the modular socket 1 of a preferred embodiment. As shown in FIG. 3, the modular socket 1 of a preferred embodiment is formed by the USB port (DC). As shown in FIG. 3, the modular socket 1 of a preferred embodiment is formed by the AC socket. FIG. 2, FIG. 3 and FIG. 4 only show three examples of the modular socket 1, and they are not the formal, final and only designs, combinations and types.

The detected data collection and system determination module 2 is connected to the modular socket 1 to collect all the data of the modular socket 1 for determination of power-off. The module 2 includes a detected data collecting module 21 and a power-off determining system module 22, wherein the detected data collecting module 21 has an optical identifying module 211 and a connection status determining module 212. The power-off determining system module 22 includes an unplug detecting and determining module 221, a poor contact determining module 222, a Bluetooth offline determining module 223, and a hardware disconnection determining module 224. The optical identifying module 211 of the detected data collecting module 21 examines optical data, such as image data, to find all the check points in the optical data which is related to automatic power-off to determine to proceed the power-off procedure or not. The check points which the optical identifying module 211 checks includes unplug of the socket, poor contact of the socket, disconnection of the socket and the hardware. The connection status determining module 212 may examines the connection of the modular socket 1 to the internet to be the check points of the automatic power-off to determine to proceed the power-off procedure or not. The check points which the connection status determining module 212 checks include Bluetooth offline and internet offline etc. to determine to proceed the power-off procedure or not. The power-off determining system module 22 is connected to the detected data collecting module 21 to examine the power module, the AC module, the DC module, and the APs (Wi-Fi) etc. and determine to proceed the power-off procedure or not. Through the unplug detecting and determining module 221, the poor contact determining module 222, the Bluetooth offline determining module 223, and the hardware disconnection determining module 224, the power-off determining system module 22 receives corresponding data from the detected data collecting module 21 to control the corresponding modules according to the detected data. For example, the connection status determining module 212 determines the specified modular socket 1 having Bluetooth offline according to the data of the Bluetooth offline determining module 223. The unplug detecting and determining module 221 determines the specified socket/hardware having no plug plugged. The poor contact determining module 222 determines a poor contact between the socket and the hardware. The Bluetooth offline determining module 223 determines the specified socket/hardware having Bluetooth offline. The hardware disconnection determining module 224 determines the specified modular socket having disconnection between the socket and the hardware. The power-off determining system module 22, take the unplug detecting and determining module 221 for example, makes the determination of no plug after x seconds when the power-off data is received.

The detected data collection and system determination module 2 proceeds the procedures of collecting detected data and determining power-off. Take the optical identifying module 211 for example, the detected data collecting module 21 obtains image data, which includes the image of the hardware contact in the socket, and the optical identifying module 211 examines the image data to verify the contact of the socket and the hardware. It is determined that the socket and the hardware are disconnected and the power-off procedure is needed to execute when the optical identifying module 211 finds a white or a light gap in the image data.

The power-off execution module 3 is connected to the power-off determining system module 22 of the detected data collection and system determination module 2. The power-off execution module 3 may cut the power of the power module off, the AC module, the DC module, the (Wi-Fi) access point module. The power-off execution module 3 is connected to a system indicating completion of power-off 30, and includes a unplug detection power-off module 31, a poor contact power-off module 32, a Bluetooth offline power-off module 33, and a hardware disconnection power-off module 34, which are connected to each other. An example of the power-off execution module 3 cutting off the power of the corresponding module after receiving the corresponding determination: the connection status determining module 212 determines that Bluetooth is offline through the Bluetooth offline determining module 223 of the power-off determining system module 22 to cut off the power of the corresponding socket module. The unplug detection power-off module 31 cuts off the power of the socket module which has the plug or the hardware unplugged. The poor contact power-off module 32 cuts off the power of the socket module which has a poor contact between the hardware and the socket. The Bluetooth offline power-off module 33 cuts off the power of the socket module which has Bluetooth offline. The hardware disconnection power-off module 34 cuts off the power of the socket module which has a disconnection between the hardware and the socket. The modular socket 1 receives the power-off data, including various data of the sockets, and transmits the data to the detected data collection and system determination module 2 to determine to proceed the power-off procedure or not, and the power-off execution module 3 proceeds the power-off procedure. Take the unplug detection power-off module 31 for example, the corresponding module is turned off after x seconds when the determination of power-off is received.

The sever database 4 is connected to the detected data collecting module 21 and the power-off determining system module 22 of the detected data collection and system determination module 2, and includes a server 41 and a database 42, which are connected to the modular socket system 100 for usage and determination. The server 41 and the database 42 may be real hardware or virtual devices. Numbers of the servers 41 and the databases 42 are depended to the system and specifications. There is no limitation to the structure, system, operating system, and ways of execution. The sever database 4 may record and access data and information, and includes at least a detected record 40 and at least a power-off determination record 401. The detected record 40 and the power-off determination record 401 are the determining results of the detected data obtained by the detected data collection and system determination module 2. There is no limitation to the content of the records.

The extended applications of the present invention include:

1. Any socket or relative products for automatic power-off:

The modular socket 1 of the present invention receives the power-off information, and may replace the modular socket 1 with the sockets 11 or the relevant products. It may automatically cut the power off with API connector or USB connecting the modular socket system 100.

2. Display of the residual power of the charging module:

Each socket 11 of the module 12 of the modular socket 1 is connected to a power display module of the charging module 5 to show the residual power on a screen (with images, digital numbers or lights). It shows information including hardware/device plugged or unplugged, residual power or charging completed.

3. Automatic power-off method of the wall socket:

The modular socket system 100 of the present invention may be directly applied to the power supply or system other than the socket. With the detected data collection and system determination module 2, it has a method of detecting the unplugged/poor contact hardware to the AC socket of the socket 11 to be directly applied to the wall socket of the same AC socket and complete the connection and automatic power-off function.

Figure 5:
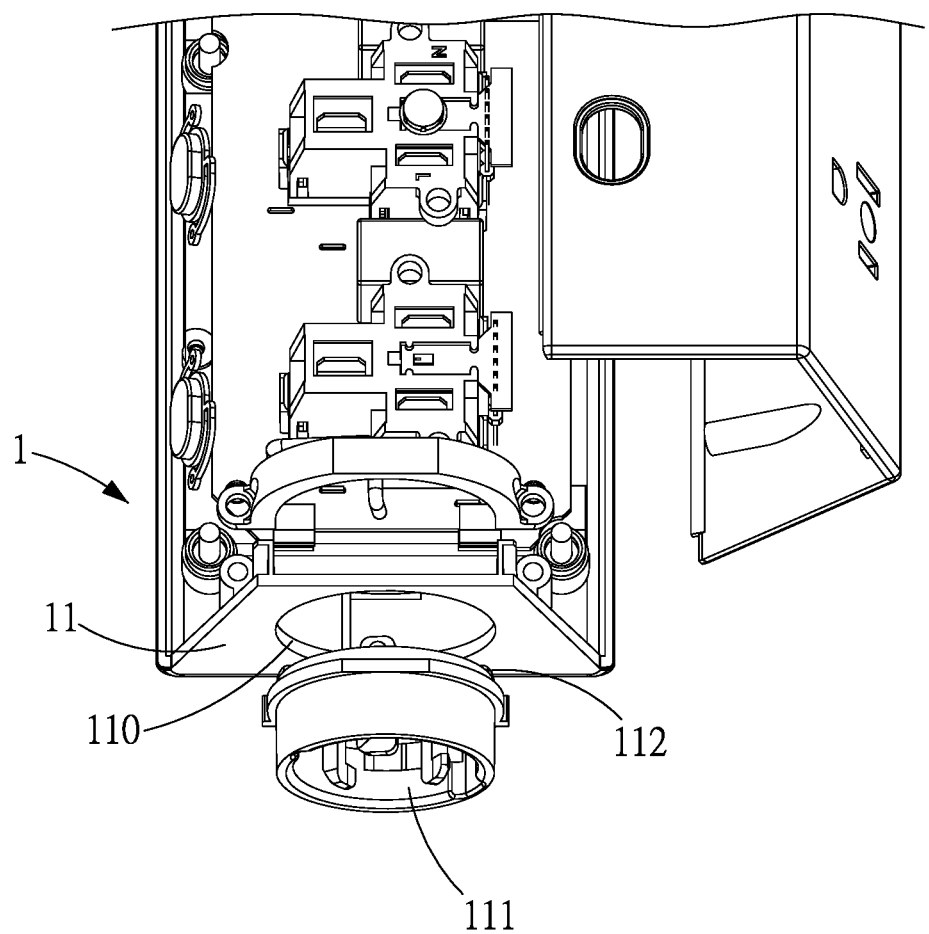
FIG. 5 is an exploded view of the preferred embodiment of the present invention, showing the socket with the semi-rotary connector.
Figure 6:
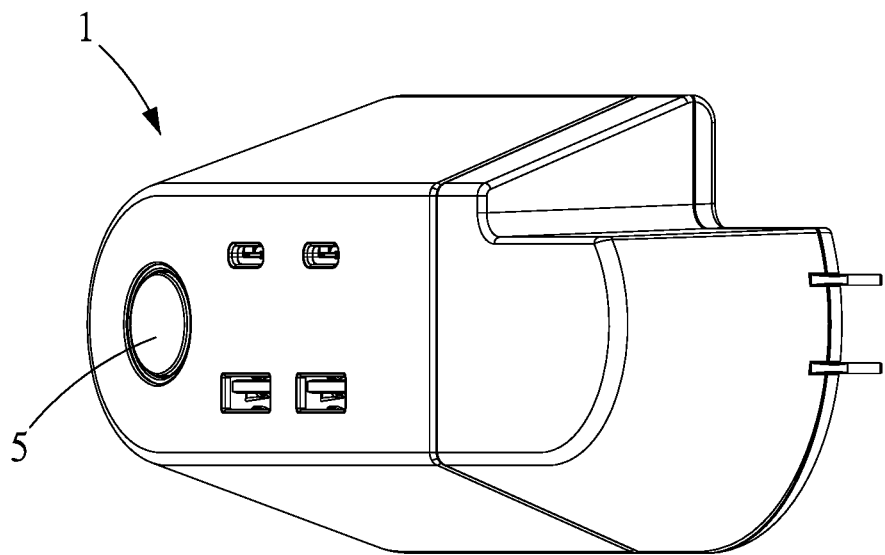
FIG. 6 s a perspective view of the preferred embodiment of the present invention, showing the modular socket with the power information module.
Figure 7:
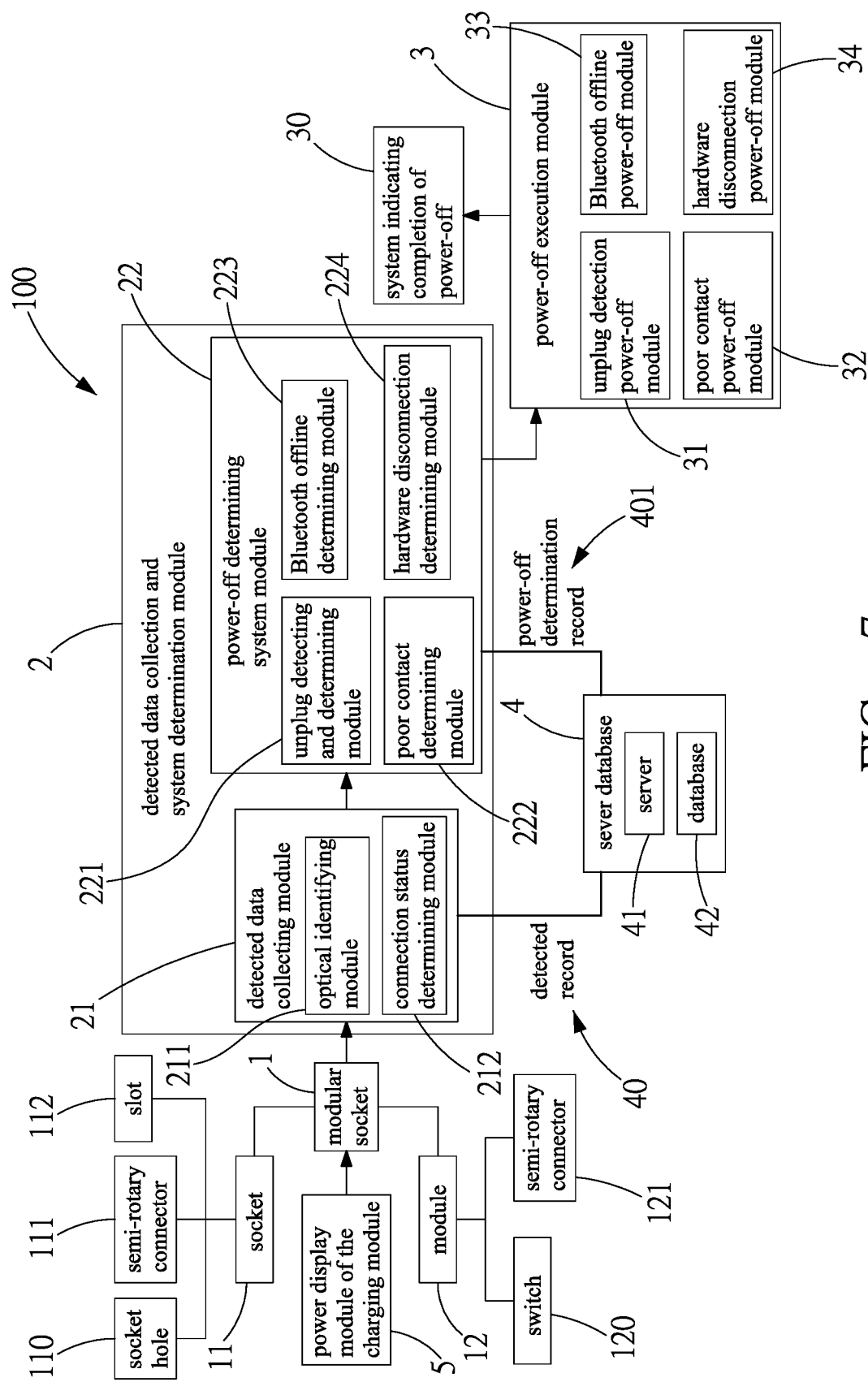
FIG. 7 is a block diagram of another preferred embodiment of the present invention.

The other functions of the present invention, as shown in the socket of the present invention having a semi-rotary connector, the modular socket of the present invention having the residual power of the power module display module, and the other structure of the present invention of FIG. 5, FIG. 6 and FIG. 7, include:

1. Scalability and convenience of the socket holes:

The socket hole 110 of the socket 11 of the modular socket 1 of the present invention, which are different from the conventional fixed socket holes, may be installed to the directly charging holes of the USB type A, B, C or Lightening to have the function of potable power supply.

2. Semi-rotary connector: (as shown in the semi-rotary connector of FIG. 7 and FIG. 5)

The modular socket 1 of the present invention provides a semi-rotary connector 111 with a slot 112 (as shown in the round element in FIG. 5) connected to the socket hole 110 of the socket 11 of the modular socket 1 to fix the loosing problem of the conventional socket which is connected in one direction (such as vertical or horizontal). The socket 11 is connected through the semi-rotary connector 111 to enhance the strength of connection of the socket 11 with the module 12 to prevent the socket form loosing or escaping. FIG. 5 is a sketch diagram, it is not the formal, final and only design and model.

3. Maximum power design:

The modular socket 1 of the present invention has the maximum thickness of the conductive material in the socket 11 with the module 12 to increase the power of the socket 11. Therefore, the present invention may stably supply power to the hardware or devices with large power, such as desktop, air condition, or refrigerator.

4. Reminder and alarm of power supply of the power module: (as shown in the modular socket with the reminder and alarm of power supply of the power module of FIG. 7 and FIG. 6)

The modular socket 1 of the present invention is provided with a power supply of power module reminder and alarm module 5 to integrate the power module and provide the function of reminder and alarm of power supply. The socket is provided with a reminder means to inform user for the connection between the socket and the hardware or device by continuously monitoring loading. The reminder means include flashing or lighting of the lights in the modular socket. The embodiment includes USB port (DC) modular socket with lights flashing or lighting for informing. FIG. 6 is a sketch diagram, it is not the formal, final and only design and model.

5. Automatic power-off function of individual socket module:

The modular socket 1 of the present invention has the separated power module and the socket modules (AC/DC modules) to ensure the modular socket 1 of the present invention having the overload limitation on the power module end to make the power-off determination. At the same time, the rest socket modules determine power-off by the detected data collection and system determination module 2 to have individual and independent automatic power-off function.

In conclusion, the present invention has following characters:

1. Modular socket: The present invention provides a plurality of socket modules, including AC module, DC module, (Wi-Fi) access point module and other equivalent modules for combination according to the user's requirement to replace the single socket of the conventional device.

2. Automatic power-off system: The present invention may take the power-off action to individual socket automatically for the unplugging and poor contact according to he user's ordinary use and need.

3. Semi-rotary connector: The conventional socket is connected in one direction (such as vertical or horizontal), so that it has the problem of disconnection or loosing. The present invention provides the semi-rotary connector for connection through rotation to fix the disconnection and loosing problems of the conventional socket.

4. Maximum power design: The thickness of the conductive material is maximum to enlarge the power of the socket of the present invention.

5. Automatic power-off method of wall socket: The present invention may be directly applied to the power supply or system other than the socket. It has a method of detecting the unplugged/poor contact hardware to the socket (AC socket) to be directly applied to the wall socket of the same AC socket and complete the connection and automatic power-off function.

The advantages of the present invention and comparison with the convention device:

1. The convention socket provides the automatic power-off function through detection of overload, and the whole socket system is turned off when overload is detected. The present invention provides the detected data collection and system determination module 2 to detect socket unplugged, poor contact, and other features for the determination of power-off procedure. It may cut the individual socket off instead of the whole socket system.

2. The conventional modulars socket usually have two pin sockets or three pin sockets. The problem of these socket is that they have low current supply because of the limited areas of connectors. Besides, the socket modules cannot be connected firmly. The present invention maximum the areas of the connectors by the controllable thicknesses of the conductive materials in the connectors to maximum the power and provides a firm connection between the sockets 11 with the modules 12, so that it has a high safety in usage.

The modular socket system 100 of the present invention makes the power-off decision according to various devices, environment, and use condition to fix the problem of the conventional device which cut the power off only through overload. The present invention further provides the semi-rotary connector 111 of the modular socket 1 to enhance the structure, safety, and normal operation of the automatic power-off of the present invention.

The modular socket system 100 of the present invention includes the modular socket 1, the detected data collection and system determination module 2, the power-off execution module 3, and the sever database 4 which are connected to each other. The modular socket 1 has the semi-rotary connector 111, the detected data collection and system determination module 2 has the detected data collecting module 21 and the power-off determining system module 22, wherein the detected data collecting module 21 has the optical identifying module 211 and the connection status determining module 212, and the power-off determining system module 22 includes the unplug detecting and determining module 221, the poor contact determining module 222, the Bluetooth offline determining module 223, and the hardware disconnection determining module 224. The power-off execution module 3 is connected to the system indicating completion of power-off 30, and includes the unplug detection power-off module 31, the poor contact power-off module 32, the Bluetooth offline power-off module 33, and the hardware disconnection power-off module 34. The modular socket 1 continuously receives power-off signals, including various conditions of the sockets, and transmits the signals to the detected data collection and system determination module 2 for the determination of power-off, and the power-off execution module 3 executes the power-off procedure. The sever database 4 is connected to the detected data collecting module 21 and the power-off determining system module 22 to provides the detected records 40 and the power-off determination records 401. The thicknesses of the conductive materials in the socket 11 with the module 12 and the power are maximum. The sockets may be assembled according to the user's requirement to have a convenient usage. Various power-off determinations may cut the power of the individual socket off. The socket 11 and the semi-rotary connector 111 provide a firm connection and high safety, and furthermore it may ensure that the automatic power-off operation may function normally. The present invention enlarges the utility of the industry of the arts and has novelty and inventive step.

In conclusion, the present invention breaks through the prior art and has the desired function. It is non-obvious to the person having ordinary skill in the art. No publication is found before the filing date of the present application, so that the present invention does not violate any acts of patent act. I expect the Examiner may have a fair examination to allow the present application. Thank you.

It should be realized that the above description is only some preferred embodiments of the present invention and should not be deemed as limitations of implementing the present invention. All substantially equivalent variations and modifications which employ the concepts disclosed in this specification and the appended claims should fall within the scope of the present invention.

What is claimed is:

1. A modular socket system with automatic power interruption, comprising:
    a modular socket including a plurality of sockets connected to each other, and each of the socket has a module to receive power-off signals, wherein the modular socket obtains status data for determining to proceed a power-off procedure, and the status data include socket unplugged data, socket contact data, Bluetooth connection data, and hardware contact data to obtain an association with users and information of power-off;
    a detected data collection and system determination module connected to the modular socket to collect all the status data of the modular socket for determination of power-off, wherein the detected data collection and system determination module includes a detected data collecting module and a power-off determining system module connected to each other, and further wherein the detected data collecting module has an optical identifying module and a connection status determining module connected to each other, and the power-off determining system module includes an unplug detecting and determining module, a poor contact determining module, a Bluetooth offline determining module, and a hardware disconnection determining module; a power-off execution module connected to the power-off determining system module of the detected data collection and system determination module to automatically cut the power of the modules of the modular socket; and
    a server database connected to the detected data collecting module and the power-off determining system module of the detected data collection and system determination module, wherein the server database a server and a database, which are real hardware or virtual devices, and no limitation to the structure, system, operating system, and ways of execution, are connected to the modular socket system for usage and determination, and further wherein the server database, which records and accesses data and information, includes at least a detected record and at least a power-off determination record, which are determining results of the data obtained by the detected data collection and system determination module;
    wherein the modular socket continuously receives power-off signals, including various conditions of the sockets, and transmits the power-off signals to the detected data collection and system determination module for the determination of power-off, and the power-off execution module executes a power-off procedure accordingly.

2. The modular socket system with automatic power interruption of claim 1, wherein the module of the modular socket includes a power module, an AC module, a DC module, an (Wi-Fi) access point module.

3. The modular socket system with automatic power interruption of claim 1, wherein the optical identifying module of the detected data collecting module examines optical data to find all check points in the optical data which is related to automatic power-off to determine to proceed the power-off procedure.

4. The modular socket system with automatic power interruption of claim 1, wherein the connection status determining module examines a connection between the modular socket and internet to be a check point of automatic power-off for determination of proceeding the power-off procedure.

5. The modular socket system with automatic power interruption of claim 1, wherein the power-off execution module is connected to a system indicating completion of power-off, and includes a unplug detection power-off module, a poor contact power-off module, a Bluetooth offline power-off module, and a hardware disconnection power-off module, which are connected to each other.

6. The modular socket system with automatic power interruption of claim 1, wherein the sockets of the modular socket are combined according to a user's need, including numbers and types of the sockets.

7. The modular socket system with automatic power interruption of claim 1, wherein the each of the sockets of the modular socket includes a semi-rotary connector with a slot to provides a copper material therein with a sufficient thickness.

8. The modular socket system with automatic power interruption of claim 1, wherein each of the sockets of the modular socket includes a switch to manipulate the sockets and the module respectively.

9. The modular socket system with automatic power interruption of claim 1, wherein the modular socket receives power-off information and replaces the modular socket with the sockets or the relevant products to automatically cut the power off with an API connector or a USB connecting to the modular socket system.

10. The modular socket system with automatic power interruption of claim 1, wherein each of the sockets of the modular socket is connected to a power display module of the charging module to show residual power.

11. The modular socket system with automatic power interruption of claim 1, wherein the modular socket system is able to be directly applied to a power supply or a system other than the socket, and automatically cut off the power of the socket which has a unplugged plug or a poor contact.

12. The modular socket system with automatic power interruption of claim 1, wherein the each of the sockets of the modular socket has at least a socket hole, and the socket hole includes USB type A, B, C and Lightening to have the function of potable power supply.

13. The modular socket system with automatic power interruption of claim 1, wherein the modular socket further has a power supply of power module reminder and alarm module to integrate the power module and provide a function of reminder and alarm of power supply.

* * * * *